2,709,710
Patented May 31, 1955

2,709,710

METHOD FOR RECOVERING PARA-HYDROXY-BENZALDEHYDE

Warren B. Crummett and Vernon A. Stenger, Midland, Mich., assignors to The Dow Chemical Company, Midland, Mich., a corporation of Delaware No Drawing. Application August 12, 1953,
Serial No. 373,882

9 Claims. (Cl. 260—600)

This invention relates to the manufacture of ortho- and para-hydroxybenzaldehydes. It pertains especially to a procedure for recovering para-hydroxybenzaldehyde from the crude product obtained by reacting phenol with chloroform in the presence of an alkali.

A method commonly used for preparing ortho- and para-hydroxybenzaldehydes is that known as the Reimer-Tiemann reaction, wherein a salt of a phenol and chloroform are reacted in the presence of an excess of alkali with resultant introduction of the aldehyde group (—CHO) onto a carbon atom of the aromatic, e. g. the benzene, nucleus of the phenol. The reaction results in formation of a mixture of the ortho- and para-hydroxy compounds. In the production of hydroxybenzaldehydes the ortho-hydroxybenzaldehyde can readily be separated from the reaction product by distillation methods since it is volatile with steam, while the para-hydroxybenzaldehyde is not. The para-hydroxybenzaldehyde remains in the residue in admixture with by-products, usually of a tar-like consistency, which render difficult its recovery in usual ways such as by distillation of the residue under reduced pressure, or by extraction of the residue with a solvent for the parahydroxybenzaldehyde.

It is a primary object of the invention to provide an improved method for recovering the para-hydroxybenzaldehyde from the reaction product of phenol and chloroform in the presence of an alkali according to the Reimer-Tiemann reaction for the production of hydroxybenzaldehydes. Another object is to provide a method for separating para-hydroxybenzaldehyde from by-products obtained in such a reaction between phenol and chloroform. Still another object is to provide a procedure for treating the residue, containing para-hydroxybenzaldehyde, remaining after distillation of ortho-hydroxybenzaldehyde from the crude reaction product which procedure permits separation of the para-hydroxybenzaldehyde from the by-products and recovery of the para-hydroxybenzaldehyde in a good yield. Other and related objects may appear from the following description of the invention.

According to the invention, the foregoing and related objects can readily be obtained by separating the ortho-hydroxybenzaldehyde, produced by the reaction of phenol and chloroform in the presence of an alkali according to the Reimer-Tiemann reaction for the production of hydroxybenzaldehydes, from the reaction product in usual ways, e. g. by steam distilling the reaction product containing both ortho- and para-hydroxybenzaldehydes, whereby the para-hydroxybenzaldehyde remains in the residue together with by-products of the reaction. The para-hydroxybenzaldehyde is recovered by dissolving the residue in an aqueous solution of an alkali metal hydroxide such as potassium hydroxide or sodium hydroxide, and thereafter separating the same from the aqueous liquid. The alkaline solution is diluted with water and is neutralized, or made acidic, with a strong mineral acid, preferably hydrochloric acid or sulfuric acid, to precipitate by-product substances while the para-hydroxybenzaldehyde remains dissolved in the aqueous liquor as solute. The precipitate is separated in usual ways, e. g. by decanting or by filtering. The solution or filtrate containing the para-hydroxybenzaldehyde is fed into contact with a salt of a strongly basic quaternary ammonium anion exchange resin, whereby the para-hydroxybenzaldehyde is sorbed by the resin and is removed from the solution. The solution is separated from the anion exchange resin, e. g. by draining or by washing the resin with water, after which the resin is washed with a water-miscible organic liquid which is a solvent for the para-hydroxybenzaldehyde, whereby the sorbed para-hydroxybenzaldehyde is eluted from the anion exchange resin. The solvent is drained from the resin, or is flushed from the resin with water. The effluent liquor, i. e. the solvent containing the eluted para-hydroxybenzaldehyde together with water, is collected as a separate fraction, and is evaporated to recover said compound. The para-hydroxybenzaldehyde thus recovered may be further purified by crystallization from a solvent.

It is important in neutralizing the alkaline solution of the residue that the solution be sufficiently dilute to retain the para-hydroxybenzaldehyde dissolved as solute in order to obtain good yields of said product, since upon neutralization of the alkaline residue solution with an acid such as hydrochloric acid, or sulfuric acid, a predominant proportion of the by-product substances, e. g. tar-like materials of unknown composition, are precipitated. It may be mentioned that the dilute aqueous alkaline solution of the residue may advantageously be partially neutralized with an acid to precipitate a first portion of the by-product substances, which precipitate is separated, e. g. by filtering, after which the solution is neutralized, or is made slightly acidic, with another portion of the acid and a further precipitate of by-product substances separated therefrom. The filtrate or solution which is free, or substantially free, of by-products is fed into contact with a salt of a strongly basic quaternary ammonium anion exchange resin to sorb the para-hydroxybenzaldehyde solute and remove it from the solution, after which the sorbed para-hydroxybenzaldehyde is eluted from the resin.

Any strongly basic quaternary ammonium anion exchange resin in the form of an ionizable salt thereof, e. g. its chloride or sulfate, may be employed in the process. The anion exchange resins and their salts are insoluble in the liquids employed in the process. Examples of suitable quaternary ammonium anion exchange resins are the resinous nitrogen-containing reaction products of a tertiary amine and a haloalkylated cross-linked insoluble copolymer of a predominant amount of at least one monovinyl aromatic hydrocarbon and a minor proportion of a polyvinyl aromatic hydrocarbon, e. g. a halomethylated copolymer of styrene, ar-ethylvinylbenzene and divinylbenzene, such as the strongly basic quaternary ammonium anion exchange resins described in U. S. Patents Nos. 2,591,573 and 2,614,099. Strongly basic quaternary ammonium anion exchange resins are available and are known to the trade as Amberlite IRA-400, Dowex-1, Dowex-2, Nalcite SBR and Nalcite SAR.

Salts of the strongly basic quaternary ammonium anion exchange resins, such as the chloride or sulfate salts of the quaternary ammonium bases, readily sorb para-hydroxybenzaldehyde from an aqueous solution containing the same as solute. After separating the treated solution from the resin, the sorbed para-hydroxybenzaldehyde can readily be displaced or removed from the resin by washing the latter with a water-miscible organic liquid that is a solvent for the para-hydroxybenzaldehyde. Examples of suitable water-miscible organic liquids are acetone, and saturated lower aliphatic alcohols such as isopropanol, ethanol, or methanol. The latter is preferred. Mixtures, or successive portions, of any two or more of such water-miscible organic liquids or solvents may also be used.

In a preferred practice, the residue remaining after steam distilling, or otherwise removing, ortho-hydroxybenzaldehyde from the product of the reaction between phenol and chloroform in the presence of an alkali is dissolved in an aqueous solution containing at least 2, preferably from 5 to 15, per cent by weight of an alkali metal hydroxide, e. g. sodium hydroxide. The alkali metal hydroxide solution is usually employed in amount corresponding to from 1 to 2 cubic centimeters of the solution per gram of the residue, although larger proportions may be used. The alkaline solution of the residue is usually diluted with water in amount corresponding to at least 50 parts by volume of the water per part by weight of the residue starting material. The dilute alkaline solution is neutralized, or made slightly acid, with a strong mineral acid such as sulfuric acid or hydrochloric acid to precipitate the by-product substances. The latter are separated, e. g. by filtering, and the solution containing the para-hydroxybenzaldehyde as solute is fed into contact with a bed of a salt, preferably the chloride or sulfate salt, of a strongly basic quaternary ammonium anion exchange resin. The anion exchange resin sorbs the para-hydroxybenzaldehyde solute and removes it from the solution. The treated solution is drained or is flushed from the bed of resin with water, after which the resin is washed with a water-miscible organic liquid such as acetone or a lower aliphatic alcohol, whereby the sorbed para-hydroxybenzaldehyde is eluted from the resin. The elutant organic liquid is drained from the bed, or usually is flushed from the bed of the resin with water. The effluent liquor containing the para-hydroxybenzaldehyde is collected as a separate fraction and evaporated to recover the product. The cycle of operations, of sorbing the para-hydroxybenzaldehyde on the anion exchange resin, separating the treated solution from the resin and washing the anion exchange resin with a water-miscible organic liquid to elute the sorbed para-hydroxybenzaldehyde from the resin is repeated, employing another portion of the solution containing the para-hydroxybenzaldehyde as solute.

Instead of feeding the aqueous liquor containing the para-hydroxybenzaldehyde to a bed of the anion exchange resin, the latter can be contacted in other ways with the liquor, e. g. by movement through a flowing or stationary body of the liquor, and then be removed from the aqueous liquor and the resin be eluted with a water-miscible organic solvent to extract the sorbed para-hydroxybenzaldehyde therefrom.

The following examples illustrate ways in which the principle of the invention has been applied, but are not to be construed as limiting its scope.

EXAMPLE 1

A charge of 63.3 grams of a tarry residue, remaining after steam distillation and recovery of salicylaldehyde (ortho-hydroxybenzaldehyde) from an acidified product of a Reimer-Tiemann reaction between phenol and chloroform, was dissolved in 111 ml. of an aqueous solution containing 10 per cent by weight of sodium hydroxide, and the solution was diluted with 2 liters of water. The residue starting material contained 26.9 per cent by weight of para-hydroxybenzaldehyde. An 800 ml. portion of the alkaline solution was further diluted with 400 ml. of water and made acid by adding 53 ml. of an aqueous hydrochloric acid solution of 9 per cent by weight of concentration. A tar precipitate was obtained. The solution was filtered to separate the tar. A charge of 500 ml. of the filtrate was fed to a 100 ml. burette filled with the chloride salt of a strongly basic quaternary ammonium anion exchange resin to form a bed of the resin approximately 40 centimeters deep. The anion exchange resin employed in the experiment was the reaction product of trimethylamine and a chloromethylated copolymer of approximately 87.5 per cent by weight styrene, 4.5 per cent ar-ethylvinylbenzene and 8 per cent divinylbenzene. The anion exchange resin was in the form of rounded granules of sizes from 20 to 50 mesh per inch as determined by U. S. standard screens. The 500 ml. of filtrate solution was fed to the column at a rate of approximately 2 ml. of the solution per minute and passed upflow through the bed of the resin. After feed of the 500 ml. of filtrate solution to the column, water was introduced to flush the solution from the bed. Thereafter, 80 ml. of acetone was fed to the column and passed downflow through the bed of the resin. The effluent liquor, having a volume of 100 ml., was collected and evaporated to dryness. There was obtained 2.26 grams of residue. It was analyzed and found to contain 1.60 grams of para-hydroxybenzaldehyde. This corresponds to recovery of 54 per cent by weight of the para-hydroxybenzaldehyde in the solution fed to the bed.

EXAMPLE 2

A charge of 24.85 grams of a residue, obtained as described in Example 1 and containing approximately 33 per cent by weight of para-hydroxybenzaldehyde, was dissolved in 85 ml. of an aqueous 10 weight per cent solution of sodium hydroxide, and diluted with 1165 ml. of water. The solution was stirred and 100 ml. of an aqueous solution containing 8 per cent by weight of hydrochloric acid added. A tarry precipitate was obtained. The solution was filtered to separate the precipitate. The filtrate was fed to the column containing the bed of the anion exchange resin described in Example 1, at a rate corresponding to 2 ml. of the solution per minute and was passed upflow through the bed of the resin until 475 ml. of the filtrate was contacted with the resin. Water was introduced to flush the solution from the bed, after which 80 ml. of methyl alcohol was fed to the column at a rate of 2 ml. per minute and passed downflow through the bed of resin. The effluent liquor having a volume of 100 ml. was collected and evaporated to dryness. There was obtained 3.64 grams of residue. It was analyzed and found to contain 2.91 grams of para-hydroxybenzaldehyde.

EXAMPLE 3

In each of a series of experiments, a portion of a still residue, which contained 31.5 per cent by weight of para-hydroxybenzaldehyde and which was obtained as described in Example 1, was dissolved in an aqueous solution containing 10 per cent by weight of sodium hydroxide. There were employed 1 gram of the residue per 1.75 ml. of the alkali solution. The resulting solution was diluted with water in amount corresponding to 52 ml. of water per gram of the residue starting material. The diluted solution was mixed with an aqueous solution containing 9 per cent by weight of hydrochloric acid in amount corresponding 2.1 ml. of the acid solution per gram of the residue starting material. Upon acidifying the solution, a tar-like precipitate was obtained. It was separated by filtering. The filtrate was fed to a 100 ml. burette, containing a bed of the chloride form of a strongly basic quaternary ammonium anion exchange resin similar to that described in Example 1, at a rate of 2 ml. per minute and passed upflow through the bed of the resin. After feed of the filtrate to the bed, water was introduced to flush the liquor from the resin. Thereafter, 50 ml. of a water-miscible organic solvent was fed to the column and passed downflow through the bed of the resin, followed by water to flush the eluting solvent from the resin. The effluent liquor was collected and evaporated to dryness. The residue was analyzed to determine the amount of para-hydroxybenzaldehyde recovered. Table I identifies each experiment and gives the weight in grams of residue starting material employed in each. The table names the water-miscible organic solvent employed as the elutant in each experiment. The table also gives the weight in grams of para-hydroxybenzaldehyde recovered and the per cent recovery, based on the para-hydroxybenzaldehyde in the residue starting material.

Table I

| Run No. | Residue, gms. | Organic Elutant | Recovered Para-Hydroxybenzaldehyde | |
|---|---|---|---|---|
| | | | gms. | percent |
| 1 | 7.88 | Formula 30 alcohol [1] | 0.97 | 39.2 |
| 2 | 8.30 | Acetone | 1.65 | 63.3 |
| 3 | 8.51 | Methanol | 1.79 | 66.8 |

[1] Formula 30 alcohol, a mixture of 9 parts by volume of 95 percent ethanol and 1 part by volume of methanol.

EXAMPLE 4

A charge of 6.71 grams of the batch of residue, containing 31.5 per cent by weight of para-hydroxybenzaldehyde, described in Example 3, was dissolved in 12 ml. of an aqueous solution containing 10 per cent by weight of sodium hydroxide. The solution was diluted with 350 ml. of water and mixed with 14 ml. of an aqueous solution containing 9 per cent by weight of hydrochloric acid. A tar-like precipitate was obtained. It was separated by filtering. The filtrate was fed to a 100 ml. burette containing a bed of the chloride form of a strongly basic quaternary ammonium anion exchange resin approximately 40 centimeters deep. The anion exchange resin employed in the experiment was the reaction product of dimethylethanolamine and a chloromethylated copolymer of approximately 87.5 per cent styrene, 4.5 per cent ar-ethylvinylbenzene and 8 per cent divinylbenzene. The anion exchange resin was in the form of granules of sizes from 20 to 50 mesh per inch as determined by U. S. standard screens. The filtrate was fed to the column at a rate of 2 ml. of the solution per minute and was passed upflow through the bed of the resin. After feed of the filtrate solution to the column, water was introduced to flush the liquor from the bed of resin. Thereafter, 50 ml. of methanol was introduced at a rate of 2 ml. per minute and passed downflow through the bed of the resin, followed by water to flush the ethanol from the column. The effluent liquor was collected and evaporated to dryness. There was obtained 1.61 grams of residue. It was analyzed and found to contain 1.19 grams of para-hydroxybenzaldehyde. This corresponds to 56.7 per cent recovery of the para-hydroxybenzaldehyde in the residue starting material.

We claim:

1. In a process for making ortho- and para-hydroxybenzaldehydes by reaction of phenol and chloroform according to the Reimer-Tiemann reaction, wherein the ortho-hydroxybenzaldehyde is separated from the reaction product leaving a residue containing para-hydroxybenzaldehyde, the steps which consist in dissolving the residue in an aqueous alkali metal hydroxide solution of at least 2 weight per cent concentration, diluting the solution with water and neutralizing the same with a strong mineral acid, whereby the para-hydroxybenzaldehyde remains dissolved as solute and alkali soluble by-product substances are precipitated, separating the precipitate from the solution, passing the solution containing the para-hydroxybenzaldehyde as solute into contact with a salt of a strongly basic quaternary ammonium anion exchange resin, whereby para-hydroxybenzaldehyde is sorbed by the anion exchange resin and is thus removed from the solution, separating the solution from the resin and washing the resin with a water-miscible organic solvent for the para-hydroxybenzaldehyde, whereby the sorbed para-hydroxybenzaldehyde is eluted from the anion exchange resin.

2. A process as claimed in claim 1, wherein the cycle of operations is carried out in continuous manner.

3. A process as claimed in claim 1, wherein the aqueous solution containing para-hydroxybenzaldehyde as solute is contacted with a bed of a salt of a strongly basic quaternary ammonium anion exchange resin.

4. A process as claimed in claim 1, wherein the chloride salt of a strongly basic quaternary ammonium anion exchange resin is employed.

5. A process as claimed in claim 1, wherein the water-miscible organic solvent for the para-hydroxybenzaldehyde is methanol.

6. In a process for making ortho- and para-hydroxybenzaldehydes by reaction of phenol and chloroform according to the Reimer-Tiemann reaction, wherein the ortho-hydroxybenzaldehyde is separated from the reaction product by distillation leaving a residue containing para-hydroxybenzaldehyde, the steps which consist in dissolving the residue in an aqueous solution containing from 5 to 10 per cent by weight of an alkali metal hydroxide, diluting the solution with water and neutralizing the same with a strong mineral acid, whereby the para-hydroxybenzaldehyde remains dissolved as solute and alkali soluble by-product substances are precipitated, separating the precipitate from the solution, passing the solution containing the para-hydroxybenzaldehyde as solute into contact with a salt of a strongly basic quaternary ammonium exchange resin, whereby the para-hydroxybenzaldehyde is sorbed by the resin and is thus removed from the solution, separating the solution from the resin by washing the same with water, then washing the resin with a water-miscible organic solvent for the para-hydroxybenzaldehyde, whereby the sorbed para-hydroxybenzaldehyde is eluted from the anion exchange resin.

7. A process as claimed in claim 6, wherein the aqueous solution containing para-hydroxybenzaldehyde as solute is contacted with the chloride salt of a strongly basic quaternary ammonium anion exchange resin.

8. A process as claimed in claim 6, wherein the water-miscible organic solvent for the para-hydroxybenzaldehyde is methanol.

9. A process as claimed in claim 6, wherein the anion exchange resin is the chloride salt of the reaction product of trimethylamine and a halomethylated insoluble cross-linked copolymer of a predominant amount of at least one monovinyl aromatic hydrocarbon and from 0.5 to 20 per cent of a divinyl aromatic hydrocarbon.

References Cited in the file of this patent

UNITED STATES PATENTS 2,449,364    Blankart _____ Sept. 14, 1948